(12) United States Patent
Cowley et al.

(10) Patent No.: US 9,910,914 B1
(45) Date of Patent: Mar. 6, 2018

(54) INFORMATION RETRIEVAL BASED ON SEMANTICS

(71) Applicants: Thomas H. Cowley, Ayer, MA (US); Stephen C. Stickells, Brookline, MA (US)

(72) Inventors: Thomas H. Cowley, Ayer, MA (US); Stephen C. Stickells, Brookline, MA (US)

(*) Notice: Subject to any disclaimer, the term of this patent is extended or adjusted under 35 U.S.C. 154(b) by 0 days.

(21) Appl. No.: 15/588,591

(22) Filed: May 5, 2017

Related U.S. Application Data

(60) Provisional application No. 62/332,167, filed on May 5, 2016.

(51) Int. Cl.
| | |
|---|---|
| *G06F 17/27* | (2006.01) |
| *G06F 17/21* | (2006.01) |
| *G06F 17/30* | (2006.01) |
| *G06N 99/00* | (2010.01) |
| *H04L 29/08* | (2006.01) |

(52) U.S. Cl.
CPC .. *G06F 17/30684* (2013.01); *G06F 17/30283* (2013.01); *G06F 17/30887* (2013.01); *G06F 17/30905* (2013.01); *G06N 99/005* (2013.01); *H04L 67/02* (2013.01)

(58) Field of Classification Search
CPC .... G06F 17/2785; G06F 17/28; G06F 17/277; G06F 17/2735; G06F 17/279; G06F 17/2775; G06F 17/278; G06F 17/2755; G06F 17/30654; G06F 17/30734; G06F 17/30401; G06F 17/218; G06F 17/227; G06F 17/27; G06F 17/30011; G06F 17/30663; G06F 17/30731; G06F 17/2247; G06F 17/2282; G06F 17/2881; G06F 17/30666; G06F 19/24; G06F 17/2705; G06F 17/21; G06F 17/30864; G06F 17/30604; G06F 17/30684;
(Continued)

(56) References Cited

U.S. PATENT DOCUMENTS

| | | | |
|---|---|---|---|
| 6,405,162 B1* | 6/2002 | Segond | ............... G06F 17/274 704/9 |
| 7,502,779 B2 | 3/2009 | Brockway et al. | |

(Continued)

OTHER PUBLICATIONS

Bollegala D. et al., "Relational Duality: Unsupervised Extraction of Semantic Relations between Entities on the Web", WWW 2010, Apr. 26-30, 2010, Raleigh, North Carolina, USA.*

*Primary Examiner* — Edgar Guerra-Erazo

(74) *Attorney, Agent, or Firm* — William A. M. Mansfield

(57) ABSTRACT

Among other things, an information retrieval process that optimizes the retrieval of highly relevant information across dissimilar documents; information retrieval is based on information understanding, using contextual word disambiguation and sentence parsing to determine well-formed sentences, storing information according to syntactical structures; the information retrieval process finds the target of the search in the subject, subject complement, or direct object and returns maximally informative factual sentences; this search method alters the traditional user experience by presenting facts about the search topic with a link to the source document sentence, rather than presenting brief snippets of text containing the search string.

20 Claims, 14 Drawing Sheets

(58) Field of Classification Search
CPC ............. G06F 17/30976; G06F 17/272; G06F 17/03253; G06F 17/30424
See application file for complete search history.

(56) References Cited

U.S. PATENT DOCUMENTS

| | | | |
|---|---|---|---|
| 8,510,321 B2 | 8/2013 | Ranganathan et al. | |
| 2002/0059289 A1* | 5/2002 | Wenegrat | G06F 17/30734 |
| 2003/0033295 A1* | 2/2003 | Adler | G06F 17/30637 |
| 2007/0179776 A1* | 8/2007 | Segond | G06F 17/2247 |
| | | | 704/9 |
| 2009/0192954 A1* | 7/2009 | Katukuri | G06F 17/3061 |
| | | | 706/11 |
| 2009/0204605 A1* | 8/2009 | Bai | G06F 17/30654 |
| 2010/0005087 A1* | 1/2010 | Basco | G06F 17/30864 |
| | | | 707/E17.017 |
| 2010/0228693 A1* | 9/2010 | Dawson | G06F 17/2705 |
| | | | 706/12 |
| 2011/0119049 A1* | 5/2011 | Ylonen | G06F 17/271 |
| | | | 704/9 |
| 2013/0246046 A1* | 9/2013 | Fan | G06F 17/2785 |
| | | | 704/9 |
| 2013/0339379 A1 | 12/2013 | Ferrari et al. | |
| 2015/0370782 A1* | 12/2015 | Fan | G06F 17/2785 |
| | | | 704/9 |
| 2016/0148096 A1* | 5/2016 | Bornea | G06F 17/277 |
| | | | 706/55 |
| 2016/0162473 A1* | 6/2016 | Cogley | G06F 17/28 |
| | | | 704/9 |

* cited by examiner

INFORMATION RETRIEVAL BASED ON SEMANTICS

NOTICE OF COPYRIGHTS AND TRADE DRESS

A portion of the disclosure of this patent document contains material that is subject to copyright protection. This patent document may show and/or describe matter that is or may become trade dress of the owner. The copyright and trade dress owner has no objection to the facsimile reproduction by anyone of the patent disclosure as it appears in the Patent and Trademark Office patent files or records, but otherwise reserves all copyrights and trade dress rights whatsoever.

CROSS-REFERENCE TO RELATED APPLICATIONS

This application is related to U.S. Provisional Patent Application Ser. No. 62/332,167 which was filed on May 5, 2016, the entire contents of which is incorporated here by reference.

TECHNICAL FIELD

This description relates generally to informational retrieval systems and, more particularly, to systems and methods for efficient and effective search of data sources using semantics (information understanding).

Categories and Subject Descriptors: H.3 [Information Storage and Retrieval]: Information Search and Retrieval Language; H.3.2 [Information Storage]: Information Storage; and H.3.1 [Content Analysis and Indexing]: Content Analysis and Indexing.

BACKGROUND

This description relates to generating and communicating curated information interactively in response to a query from one party to a database. Searching for information, such as by querying a database using keywords or searching for documents or web pages using a search engine, can be inefficient and may not return desired results, particularly if the keywords are not well chosen. Given this long-felt unmet need, better systems and methods for searching for information in databases are desirable.

The World Wide Web encompasses 4.49 billion pages of which approximately 50% are in English. Often relevant information about a topic is distributed across several documents. The prior art does not contain adequate solutions for finding relevant information given this situation.

SUMMARY OF THE INVENTION

The technical problem that the system of the present invention solves is the extraction of contextual knowledge from large, unstructured document databases, especially those found on the Internet. The solution described does not preclude other approaches but presents a unified system and method with novel features. In general, in an aspect, a computer-implemented information retrieval network for curated information based in part on semantic analysis, wherein one or more users can dynamically obtain responses to queries of multiple search terms across bodies of corpus.

Implementations of real-time curation based on semantic analysis from a networked database may include one or a combination of any two or more of the following features: a gloss vector engine configured to generate highly semantic gloss vectors for efficient data mining by unsupervised machine learning; a deconstruction engine configured to identify well-formed sentences; a data discovery engine configured to identify indirect communicating links; a collocation engine configured to identify compound nouns; a disambiguation engine configured to assign contextually appropriate nouns; a generic noun disambiguation engine configured to identify context shifts produced by a use of generic or common nouns; a pronoun disambiguation engine configured to link common nouns to proper nouns; a data evaluation engine configured to identify well-formed sentences containing key information; a retrieval engine configured to return information of the highest semantic value for a given search term; a context targeting engine configured to display in context the specific sentence in the source article showing the query results.

In another aspect, an information retrieval process that optimizes the extraction of highly relevant information across dissimilar documents using semantic analysis to disambiguate words in context and parse text to determine well-formed sentences, find from information stored syntactical structures the target of a query in the subject, subject complement, or direct object.

Implementations of real-time optimizing search using semantic analysis from a networked database may include one or a combination of any two or more of the following methods: creating a highly relational lexical database; using HTML parsing; using chunking based on sentence pattern transformations; using word sense disambiguation based on context and extended gloss overlap; using personal pronoun resolution based on context; using generic noun resolution based on context and extended gloss overlap; using targeting responses; and using associated document retrieval.

In another aspect, the present invention, which is fully defined in the claims, comprises an information retrieval system to form a semantically analyzed corpus, providing a hypertext link to the source document for a derived fact in context rather than, as in conventional, linking only to the general location of the source document.

In general, in another aspect, an information retrieval system that uses artificial intelligence based on semantic analysis and deep contextual knowledge so as to simulate human search behavior across documents.

Implementations of an information retrieval system using artificial intelligence based on semantic analysis from a networked database may include one or a combination of any two or more of the following methods and features: resolving apparent ambiguity by staging context based on the title, and processing the text, sentence by sentence while maintaining context with the author's topic; a query consisting of a single noun or noun phrase returns full sentences prioritized by information clarity, permitting the an efficient summary of a specific topic In general, in an aspect, the real-time, optimizing search system based on semantic analysis enables the efficient extraction of contextual knowledge from large, unstructured document databases.

These and other aspects, features, implementations, and advantages, and combinations of them, can be expressed as methods, apparatus, systems, components, program products, business methods, and means or steps for performing functions, or combinations of them.

Other features, aspects, implementations, and advantages will become apparent from the description, the drawings, and the claims.

BRIEF DESCRIPTION OF THE FIGURES

A full and enabling disclosure of the present invention, including the best mode thereof, directed to one of ordinary skill in the art, is set forth in the specification, which makes reference to the appended figures, which are not necessarily drawn to scale, wherein.

Figure 1:
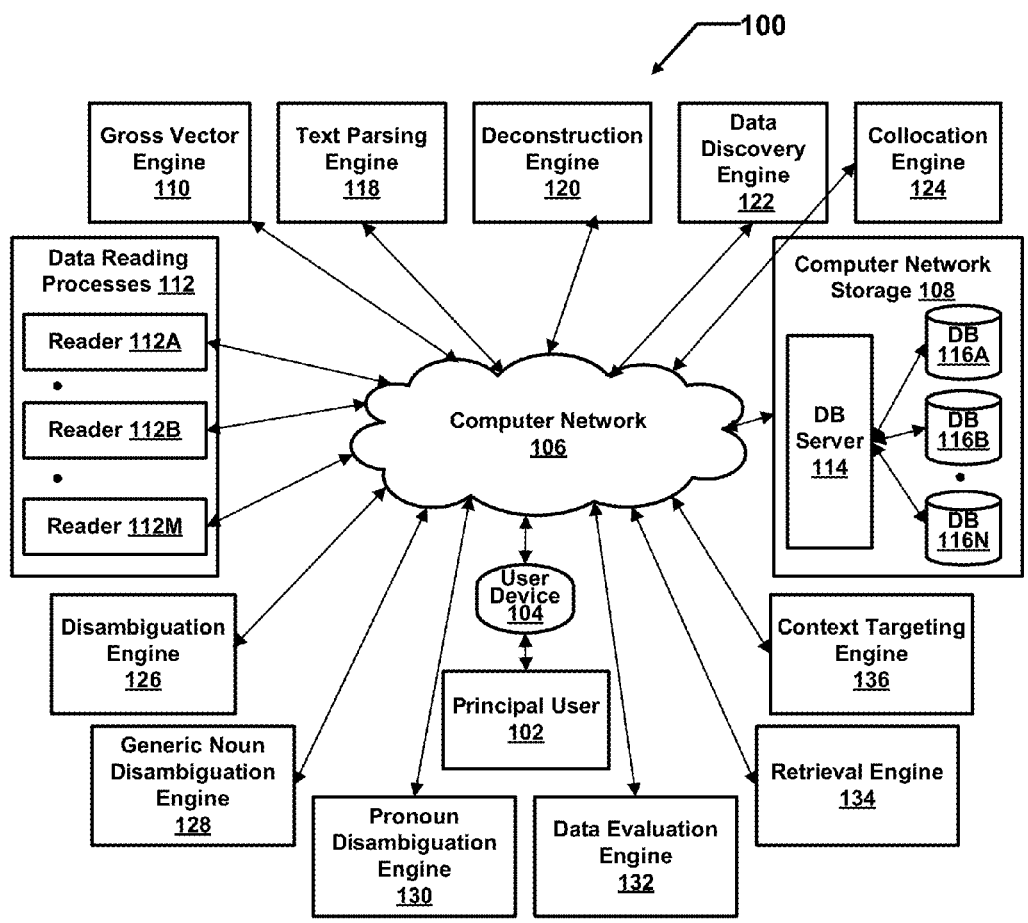
FIG. 1 is a block diagram of a system for information retrieval based on semantic analysis.

In the system here described the terms "document" and "database" are given for illustration purposes only and not for limitation. The system described here may be used by students for educational research, by business managers for company manuals for instructing employees, by military instructors for identifying appropriate solutions for training recruits, and in other situations where one party requires information curated by semantic analysis to answer queries.

DETAILED DESCRIPTION OF THE PREFERRED EMBODIMENT

Reference now will be made in detail to embodiments of the invention, one or more examples of which are illustrated more fully in the drawings. Each example is provided by way of explanation of the invention, not limitation of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. In fact, it will be apparent to those skilled in the art that various modifications and variations can be made in the present invention without departing from the scope or spirit of the invention. For instance, features illustrated or described as part of one embodiment can be used with another embodiment and such variations come within the scope of the appended claims and their equivalents.

Like numbers refer to like elements to those skilled in the art. Like numbers refer to like elements throughout. The term "exemplary" as used throughout this document is defined to mean "example." It will be appreciated that terms such as "left", "right", "top", "bottom", "inwardly", "outwardly", "front", "inner", "up", and "down" and other positional descriptive terms used herein below are used merely for ease of description and refer to the orientation of the components as shown in the Figures. It should be understood that any orientation of the elements described herein is within the scope of the present invention.

As desired, embodiments of the invention may include the real-time, interactive information retrieval system with more or less of the components illustrated.

The invention is described below with reference to block diagrams, function tables, and flow diagrams of systems, methods, apparatuses, and/or computer program products according to exemplary embodiments of the invention. It will be understood that one or more blocks of the block diagrams, flow diagrams, and function tables, and combinations of blocks in the block diagrams, flow diagrams, and function tables, respectively, can be implemented by computer-executable program instructions Likewise, some blocks of the block diagrams, flow diagrams, and function tables may not necessarily need to be performed in the order presented, or may not necessarily need to be performed at all, according to some embodiments of the invention.

These computer-executable program instructions may be loaded onto a general-purpose computer, a special-purpose computer, a mobile device, such as a laptop or smartphone, a processor, or other programmable data processing apparatus to produce a particular machine, such that the instructions that execute on the computer, processor, or other programmable data processing apparatus, create means for implementing one or more functions specified in the flow diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means that implement one or more functions specified in the flow diagram block or blocks. As an example, embodiments of the invention may provide for a computer program product, comprising a non-transitory computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Alternately the computer operating system, all data storage, and computer instructions for executing the interactive operations may be embodied on a single machine in a hyperconvergent arrangement. In one embodiment, a handheld device, such as a smartphone, could be used to deliver said computer program instructions so that persons could pose questions that they want answered by the community of student users who could input answers via said handheld device. These computer-implemented processes could be virtualized in a cloud-based environment.

Accordingly, blocks of the block diagrams, flow diagrams, and function tables support combinations of means for performing the specified functions, combinations of elements or steps for performing the specified functions and program instruction means for performing the specified functions. It will also be understood that each block of the block diagrams, flow diagrams, and function tables, and combinations of blocks in the block diagrams, flow diagrams, and function tables, can be implemented by special-purpose, hardware-based computer systems that perform the specified functions, elements or steps, or combinations of special purpose hardware and computer instructions.

While the invention has been described in connection with what is presently considered to be the most practical embodiment and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

While the invention has been described in connection with what is presently considered to be the most practical embodiment and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

Definitions

The term "word sense", as used herein refers to what a person of ordinary skill in the art of computational linguistics would understand it to mean. The problem of word-sense disambiguation is in general an open problem but is resolved by the present invention, which is fully defined in the claims, using artificial intelligence.

The term "gloss vector," as used herein refers to what a person of ordinary skill in the art of computational linguistics would understand it to mean, i.e., measures of degrees of relational similarity by forming second-order co-occurrences from the wordnet definition of concepts known as glosses.

The term "artificial intelligence" as used herein means methods and techniques used to achieve efficient solutions to problems usually requiring human intelligence, such as expert or heuristic rules or machine learning.

The term "unsupervised machine learning" as used herein means a data-driven algorithm for inferring the classification of a group of characters into words, or words into parts of speech, e.g., noun, or the relations of two words, e.g. nouns and corresponding pronouns.

The term "automaton" as used herein refers to a computer module capable of performing a set of coded instructions but having a range of responses to different inputs.

The term "well-formed sentence" as used herein means a collection of words that express a thought which usually: starts with a capital letter at the beginning, has a full-stop at the end, there is a subject and a predicate. a "well-formed sentence" can be long or short, simple or complex, and can be broken up by commas, semi-colons, colons, dashes, etc.

The term "off-line information mining process," as used herein, means an analytic procedure designed to explore data in search of dependable patterns and/or systematic relationships between variables to create an amalgamated database created and processed without real-time human oversight, typically with a specific set of computational resources.

The term "syntactically understand," as used herein means relating to, or conforming to the rules of syntax. Syntax refers to the ways in which one orders specific words to create logical, semantically relevant sentences. While the parts of speech are all the different types of words that one can use, syntax is the set of rules, patterns, or processes by which one can put them together.

The term "well-formed thought," as used herein means intuitive consciousness, or direct and immediate access to knowledge that can be presented linguistically, following rules defined by a language and its specific grammar.

The term "highly relational lexical database," as used herein means a lexical (relating to the words or vocabulary of a language) resource which has an associated software environment database, in this case a relational database management system (RDBMS) which permits access to its contents using SQL (Structured Query Language) as the language for querying and maintaining the database.

The term "HTML parsing" as used herein means to resolve (a sentence) into its component parts and describe their syntactic roles. HTML parsing is basically: taking in HTML code and extracting relevant information like the title of the page, paragraphs in the page, headings in the page, links, bold text etc.

The term "chunking based on sentence pattern transformations," as used herein, means dividing sentences into non-overlapping segments with the potential to be transformed. In computational linguistics, "transformation" refers to a process by which an element in an underlying deep structure of a sentence is converted to an element in the surface structure or vice versa. Sentence transformations relate to changing the grammatical structure of a sentence without changing the meaning of a sentence.

The term "word sense disambiguation (WSD) based on context and extended gloss overlap," as used herein means identifying which sense of a word (i.e. meaning) is used in a sentence, when the word has multiple meanings by utilizing the contextual location of the word in a phrase as well as the extended gloss overlap values.

The term "personal pronoun resolution based on context," as used herein means identification of the antecedents of pronominal anaphors in texts based upon the context of the pronoun in a phrase.

The term "generic noun resolution based on context and extended gloss overlap," as used herein means using context within a phrase and extended gloss overlap identifiers to recognize a generic noun. A generic noun phrase refers to a kind or class of individuals, not a specific individual. For example, in the sentence "The lion was the most widespread mammal", the lion is understood as a reference to the class "lion" instead of a specific lion.

FIG. 1 is a block diagram of an example of the computer-implemented, informational retrieval system, 100, for real-time, interactive semantic curation from a networked database. In this example, a computer network, 106, connects a network provider (such as Google or a corporation or government) with the user devices, 104, such as workstations, mobile devices, mobile computers, for communicating across the computer network, 106, and this is linked to computer network storage, 108. In some examples, the network provider can be the operator or host of the system in addition to or instead of an existing network provider. A Principal User, 102, can enter queries and receive responses; or follow up responses to see the context of the fact pattern displayed. The network accessible database or databases can be mined by a set of Data Reading Processes, 112 (112A, 112B, . . . . , 112M). A Gloss Vector Engine, 110, together with a Text Parsing Engine, 118, determine the potential structure of the document which is analyzed by the Deconstruction Engine 120. The semantic analysis of the Data Discovery Engine, 122, determines the relevance to the query. The Collocation Engine, 124, determines groupings of acronyms or abbreviations or phrases that can be aggregated (if any then the Text Parsing Engine, 118, is reapplied). Contextual disambiguation is applied, using one or more methods, such as machine learning, to clarify the intent of the text by linking nouns or pronouns by the Disambiguation Engine, 126, the Generic Noun Disambiguation Engine, 128, and the Pronoun Disambiguation Engine, 130. The semantic value of retrieved facts relative to the User's query is determined by the Data Evaluation Engine, 132. The Retrieval Engine, 134, obtains and reconstructs an ordered list of relevant findings about the User's query and displays them. Associated with each fact is a tag for the Context Targeting Engine, 136, which when activated by the User display the fact-sentence in the context of the source document. The database server, 114, has one or more databases, 116 [116A, 116B, . . . , 116N], for storing a wide variety of information useful for or related to the operation of the system, including lexical data, intermediate results, and HTML links.

Figure 2:
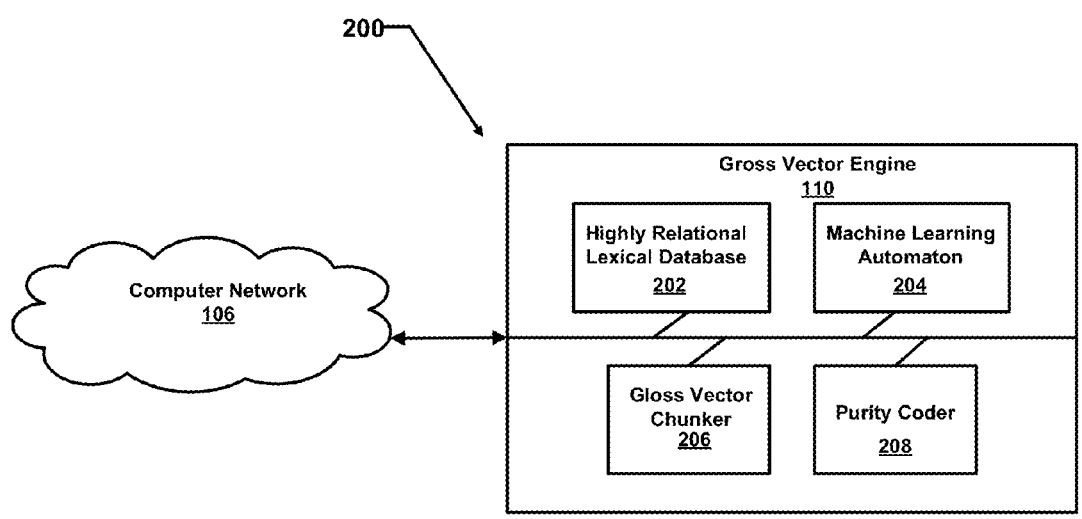
FIG. 2 is a block diagram of a Gloss Vector engine.

FIG. 2 is a block diagram, 200, of an exemplary Gloss Vector Engine, 110, of the system, 100. A Gloss Vector Chunker, 206, using a Highly Relational Lexical Database, 202, generates a semantic categorization automaton by reorganizing the contents of said Database including words, sense types, sense content, and semantic relationships for each sense and sense content. The reorganization starts with a single word and iterates on any new unprocessed words to build out the word table. Said automaton, the Machine Learning Automaton, 204, has all entities related to each other and is thus enabled to define relationships among words in the text of the search documents. Said automaton, the Machine Learning Automaton, 204, facilitates sentence processing by introducing new entries to the list of words. For example, for an article on Abraham Lincoln the system stored 329,124 unique words, 447,577 word senses, of which 119,429 were unique, and 41,486,343 had semantic relationships. Said Gloss Vector Engine, 110, when generating a gloss vector from the definition of Paris as "the capital and largest city of France, and international center of culture and commerce" parses through the definition dropping sentence constructors such as noun determiners, conjunctions, prepositions, and punctuation; and converting words to base form, e.g., "largest" to "large" to arrive at: capital, large, city, France, international, center, culture, and commerce. In an embodiment, the highly relational lexical database was WordNet but other such databases could be substituted in other embodiments. Said Gloss Vector Chunker, 206, is connected to a Purity Coder, 208.

Figure 3:
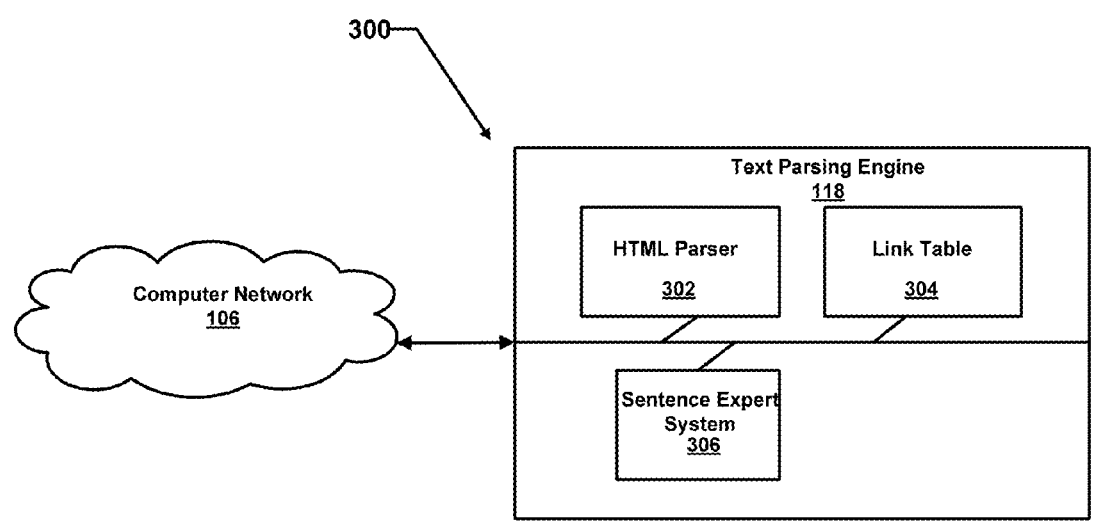
FIG. 3 is a block diagram of a Text Parsing Engine.

FIG. 3 is a block diagram, 300, of an exemplary Text Parsing Engine, 118, of the system, 100, which receives input from the Readers, 112a, . . . , 112m, which crawl the Internet or other document databases for documents given a search term or terms. When the document is retrieved, and formatted with hypertext markup language (HTML) embedded URLs will be searched for by the HTML Parser, 302. A standard PDF management process will be used if a document is in Portable Document Format to extract the URLs then checks the URLs in a Link Table, 304, to see if the URLs have been previously encountered. Said Text Parsing Engine, 118, examines the text for Blocks of Characters, which may be sentences, using basic rules via a Sentence Expert System 306, some of which also check metadata to determine titles.

Figure 4:
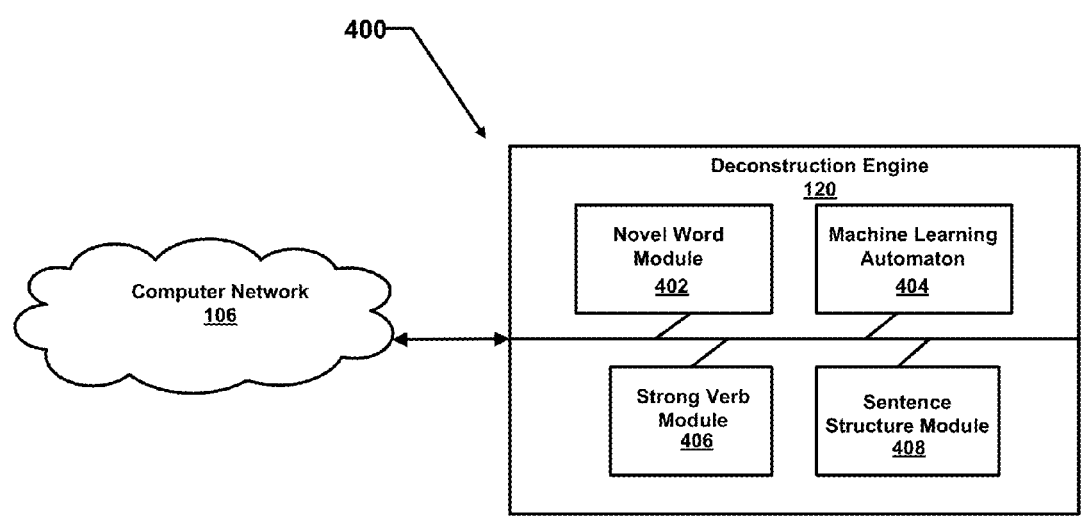
FIG. 4 is a block diagram of a Deconstruction Engine.

FIG. 4 is a block diagram, 400, of a computer network, 106, linked to an exemplary Deconstruction Engine, 120, of the system, 100, that establishes the subject, predicate relationship; establishes the sentence pattern; determines the word type (noun, verb, adjective, and adverb). Novel Word Module, 402, checks strings of data to identify words, numbers, punctuation or some combination and whether the word is already known. The Strong Verb Module, 406, employs a set of mutually exclusive rules to establish the strong verb of a sentence, if one exists. Once the strong verb is found, the Sentence Structure Module, 408, analyzes the text to determine the full sentence structure with a sequential set of rules to iterate through the sentence to correctly identify each word type. In addition to explicitly defined rules the analysis is carried out by unsupervised machine learning module, Machine Learning Automaton, 404.

Figure 5:
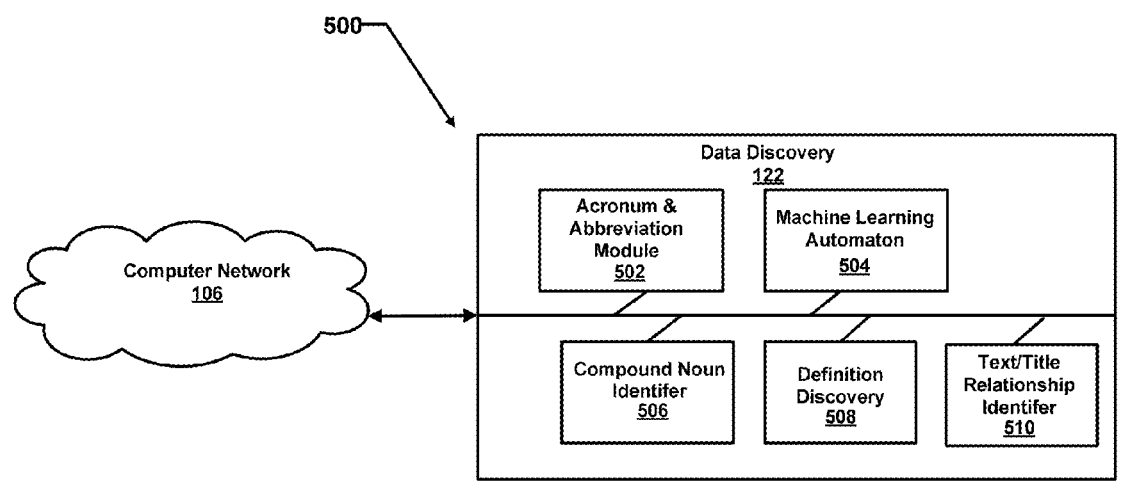
FIG. 5 is a block diagram of a Data Discovery Engine.

FIG. 5 is a block diagram, 500, of a computer network, 106, linked to an exemplary Data Discovery Engine, 122, of the system, 100, that establishes indirectly communicated information including but not limited to compound words, abbreviations, acronyms, definitions, and relationships between text and title. The Acronym and Abbreviation Identifier Module, 502, uses a set of heuristic rules to establish the placeholder. For example, "Gastroesophageal reflex disease (GERD)" associates GERD with the single compound noun "gastroesophageal-reflux-disease." The Machine Learning Automaton, 504, is connected to the Compound Noun Identifier, 506, which finds compound nouns and recategorizes them. The Definition Discovery, 508, finds any word definitions and links them. The Text/Title Relationship Identifier, 510, determines text that may indicate the title of the document, which enables its relevance to the query topic.

Figure 6:
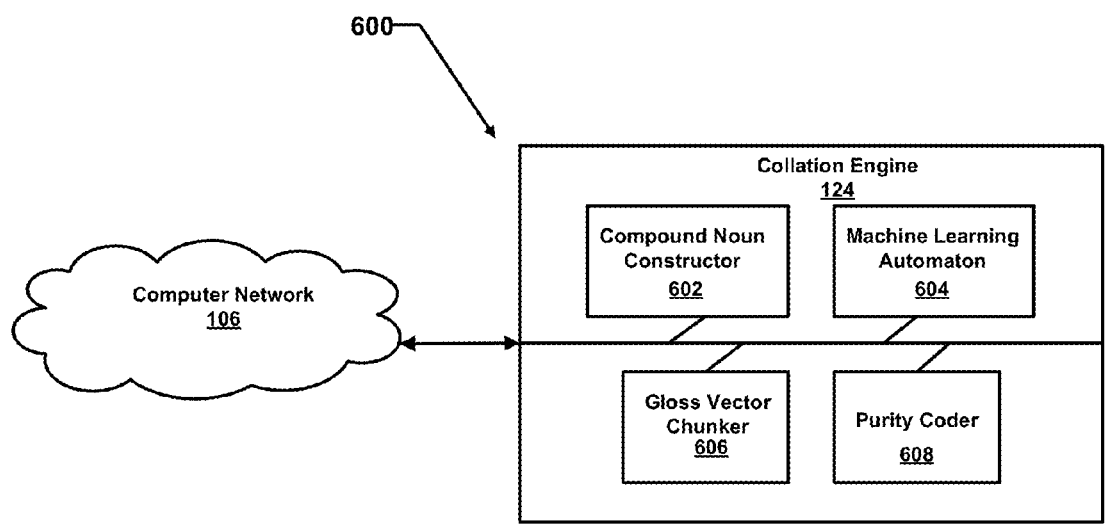
FIG. 6 is a block diagram of a Collocation Engine.

FIG. 6 is a block diagram, 600, of a computer network, 106, connected to an exemplary Collocation Engine, 124, of the system, 100, that identifies any collocation words and replaces them with compound noun equivalent using Compound Noun Constructor, 602. The Collation Engine, 124, iterates through words using the Machine Learning Automaton, 604, which is connected to the Gloss Vector Chunker, 606, and the Purity Coder, 608, and the iteration through words continues until the Machine Learning Automaton, 604, reaches the end of a sentence, encounters a sentence constructor, or encounter a non-noun, e.g., verb, adjective, adverb. For example, given the search term "Lincoln", the Collocation Engine next finds "Lincoln Highway" and continues to encompass "Lincoln Highway Hackensack River Bridge" before terminating the noun compounding but parses the full sentence as "The Lincoln-Highway-Hackensck-River-Bridge is a vehicular vertical-lift-bridge crossing . . . ."

Figure 7:
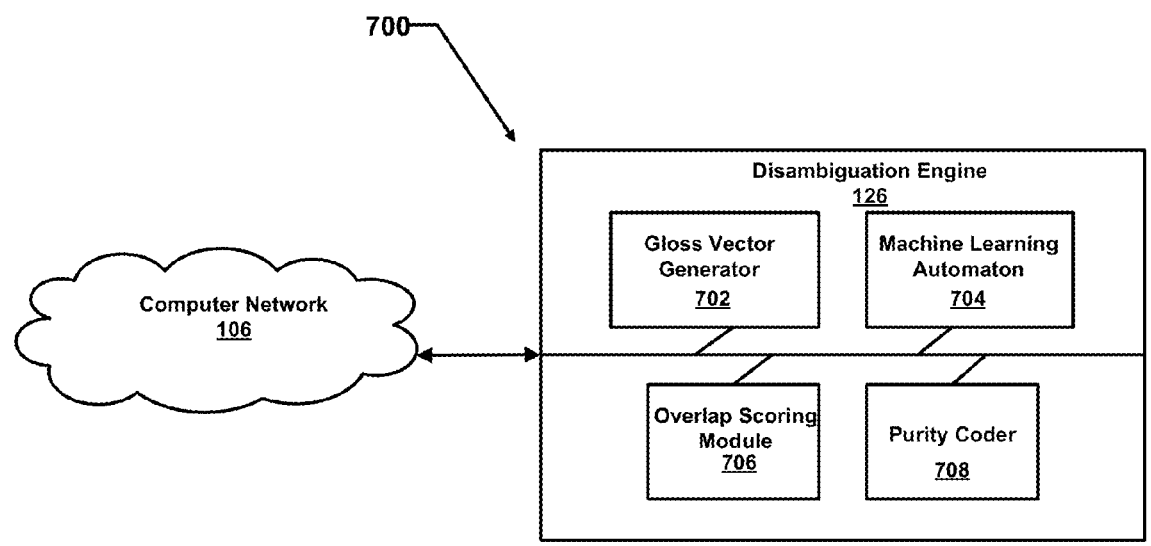
FIG. 7 is a block diagram of a Disambiguation Engine.

FIG. 7 is a block diagram, 700, of computer network, 106, connected to an exemplary Disambiguation Engine, 126, of the system, 100, that uses a contextual disambiguation method implemented by the Machine Learning Automaton, 704, applied to gloss vectors from a Gloss Vector Generator, 702, in which scores overlap, with a score of 1 being closest to the word, in an Overlap Scoring Module, 706, connected to a Purity Coder, 708.

Figure 8:
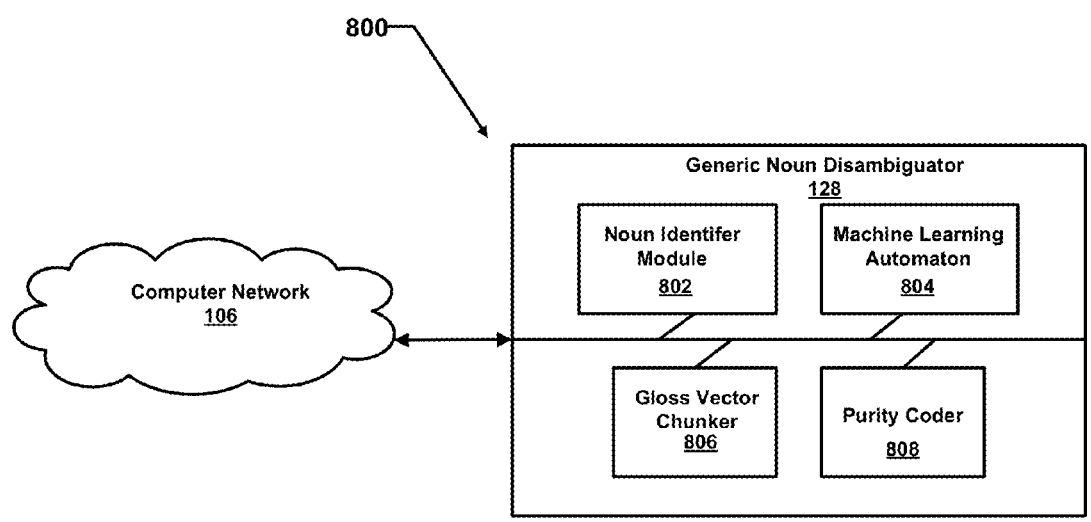
FIG. 8 is a block diagram of a Generic Noun Disambiguation Engine.

FIG. 8 is a block diagram, 800, of a computer network, 106, connected to an exemplary Generic Noun Disambiguator, 128, of the system, 100, that establishes subsequent substitution of nouns by generic noun without semantic loss by rules with a Noun Identifier Module, 802, and by inference from patterns with a Machine Learning Automaton, 804; this being connected to a Gloss Vector Chunker, 806, and a Purity Coder, 808.

Figure 9:
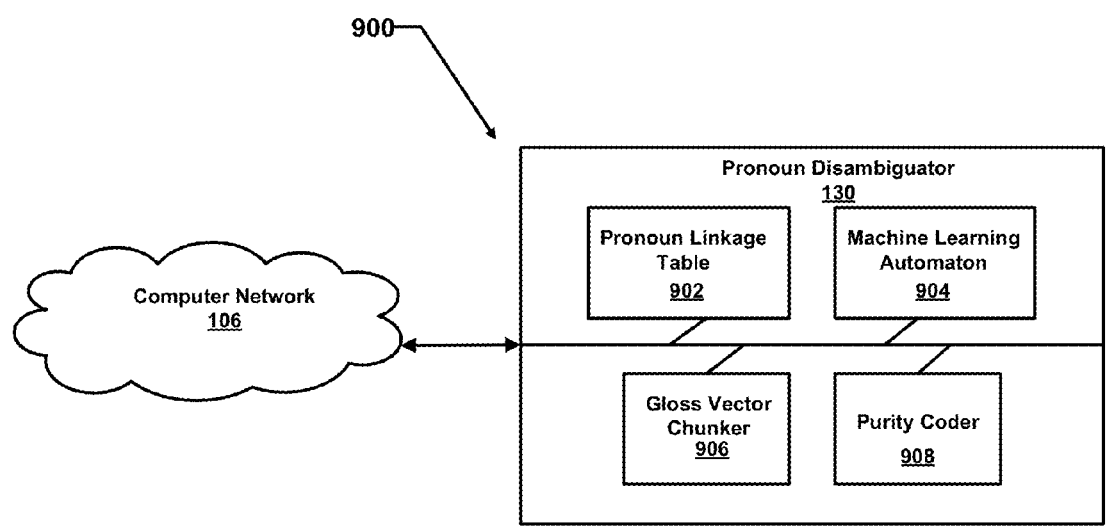
FIG. 9 is a block diagram of a Pronoun Disambiguation Engine.

FIG. 9 is a block diagram, 900, of a computer network, 106, linked to an exemplary Pronoun Disambiguation Engine, 130, of the system, 100, that determines the linkage between the noun of a topic of conversation and a substituted pronoun so as to maintain semantic content using a Pronoun Linkage Table, 902, and a Machine Learning Automaton, 904, that infers the pronoun from the data and evidence by explicit and implicit rules; and this is connected to a Gloss Vector Chunker, 906, and a Purity Coder, 908.

Figure 10:
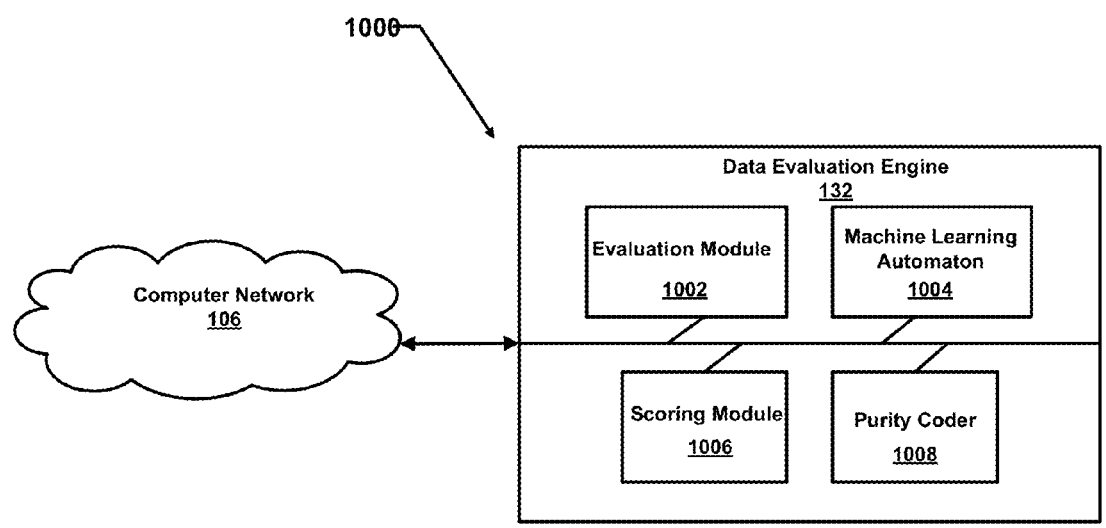
FIG. 10 is a block diagram of a Data Evaluation Engine.

FIG. 10 is a block diagram, 1000, of a computer network, 106, connected to an exemplary Data Evaluation Engine, 132, of the system, 100, that measures semantic relevance by means of Evaluation Module, 1002, assisted by a Machine Learning Automaton, 1004, and then measures relevance via a Scoring Module, 1006, which is connected to a Purity Coder, 1008. For example, a sentence achieves a score of 1 if it does not have a leading adjunct, the subject is simple, the subject complement is simple, the subject or subject complement starts with a noun determiner, and the subject noun appears in the title of the document being processed.

Figure 11:
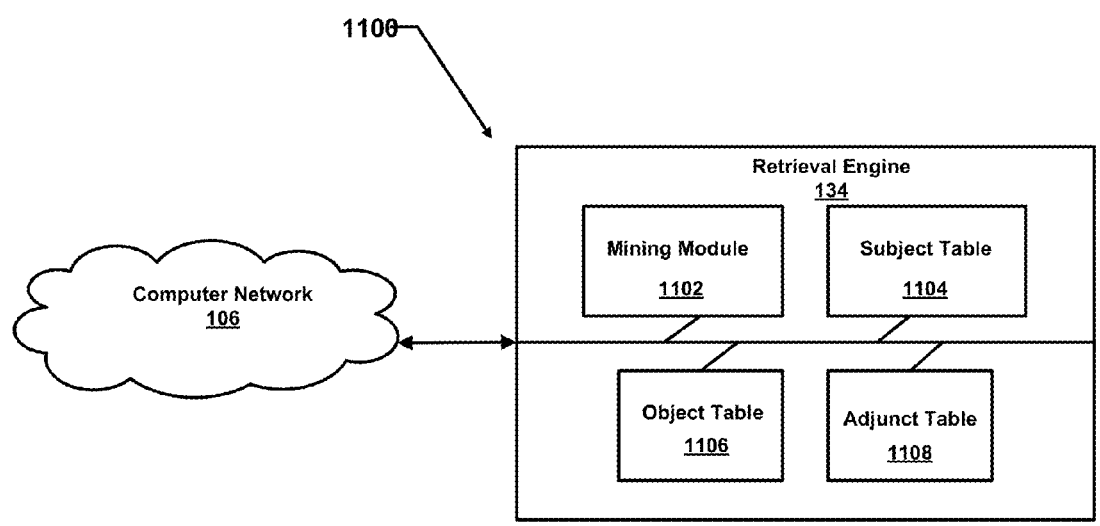
FIG. 11 is a block diagram of a Retrieval Engine.

FIG. 11 is a block diagram, 1100, of a computer network, 106, connect to an exemplary Retrieval Engine, 134, of the system, 100, that mines the Subject Table, 1104, the subject complement table, the Object Table, 1104, and the Adjunct Table, 1108, by means of a Mining Module 1102, to select high value information.

Figure 12:
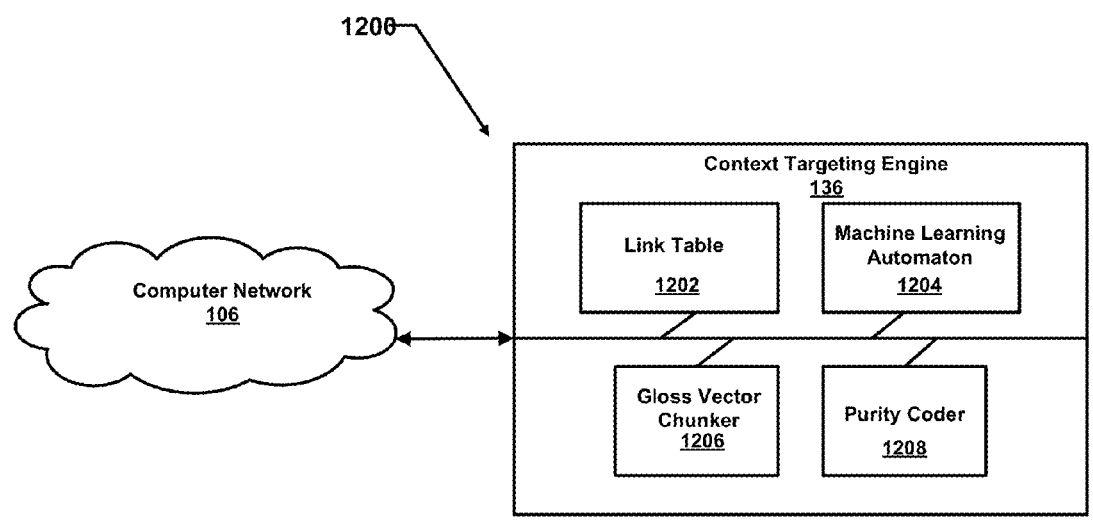
FIG. 12 is a block diagram of a Context Targeting Engine.

FIG. 12 is a block diagram, 1200, of a computer network, 106, connected to an exemplary Context Targeting Engine, 136, of the system, 100, that by means of a Link Table, 1202, displays the sentence chosen within the context of the source document. Said Link Table, 1202, is connected to a Machine Learning Automation, 1204, a Gloss Vector Chunker, 1206, and a Purity Coder, 1208.

Figure 13:
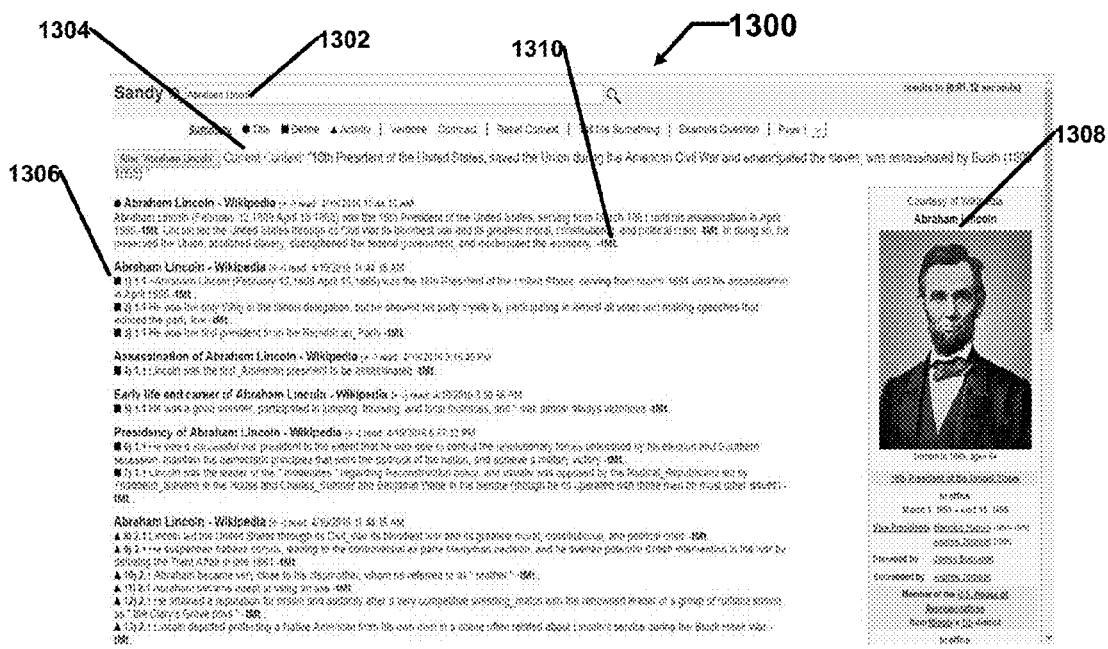
FIG. 13 is a query response interface.

FIG. 13 shows an exemplary user interface in response to the query "Lincoln" input into the computer-implemented, informational retrieval system for real-time, interactive semantic curation from a networked database. The query topic, 1302, is "Abraham Lincoln" with the current context, 1304, as "16$^{th}$ President of the United States . . . " with the query results ordered by semantic value, 1306. An image is automatically retrieved and placed on the query results dashboard, 1308. The tag tMt, 1310, serves as a hyperlink to the sentence in the context of the source document.

Figure 14:
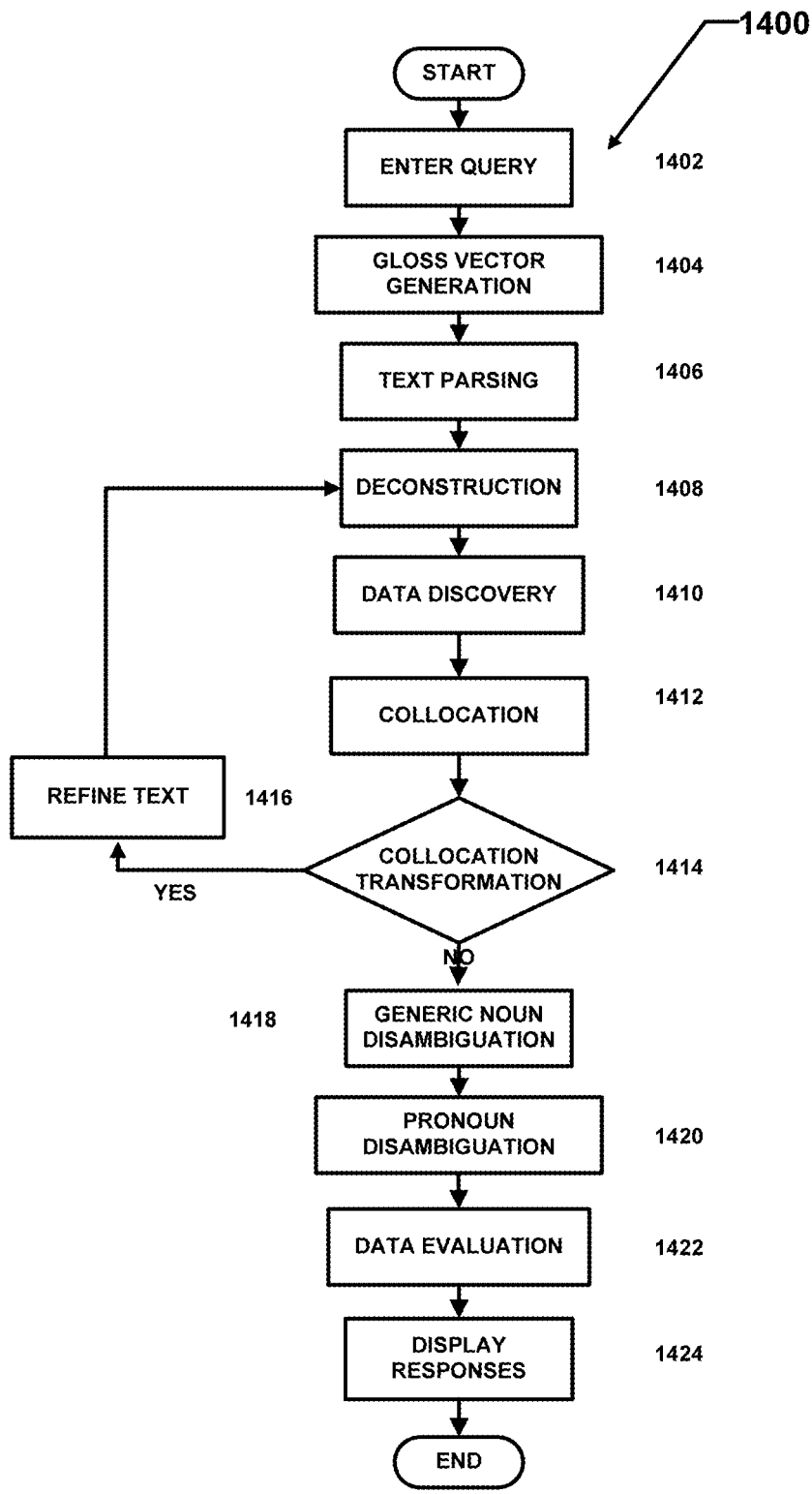
FIG. 14 is a flowchart of a process for Information Retrieval using semantic analysis The system described here enables a person (sometimes called a User) to enter a query against a large distributed document database and receive a set of responses ordered by semantic value with the option of reviewing the source of the selected response in the context of the source document. For instance, the system described here can be used to efficiently provide responses of high semantic value to a particular topic of investigation with the responses generated automatically from disparate sources, such as documents on the Internet, documents in a state government database, or documents in a corporate archive, among others.

FIG. 14 shows an exemplary flow chart, 1400, of the processes invoked in responding to a query. The process is initiated by the entry of a query topic by the Principal User (Step 1402). Associated with the query topic is a gloss vector generated by the Gloss Vector Engine (Step 1404). One or more Readers (as indicated in FIG. 1) mine the network accessible database using the Text Parsing Engine to determine related words or blocks of text (Step 1406). The text is deconstructed into syntactical structure such as words by the Deconstruction Engine (Step 1408). The text is further analyzed by the Data Discovery Engine (Step 1410). Next the parsed and analyzed text is searched for internal references by the Collocation Engine (Step 1412). If such references are found (Step 1414) then the document is reorganized (Step 1416) and reparsed by the Text Parsing Engine and re-analyzed. Otherwise, context disambiguation is applied to determine generic nouns by the Generic Noun Disambiguator (Step 1418) and to determine pronouns by the Pronoun Disambiguator (Step 1420). The gathered information is now evaluated for semantic relevance to the query topic and ordered by the Data Evaluation Engine (Step 1422). Now the semantically ordered information is retrieved by the Retrieval Engine and displayed for the User (Step 1424). At this point the User can also invoke the Context Targeting Engine to view the fact sentence in the context of the source document. Otherwise, a fresh or follow-on query can be initiated and the process repeated or the session ended.

A critical aspect of the operation of system is the application of unsupervised machine learning so to describe hidden structure from unlabeled, unstructured data. Unformatted data such as plain text is considered unlabeled and unstructured, thus the invention infers structure and labels to the data as an automaton. The system deduces and interprets information from evidence and reasoning (rules) rather than from explicit labels or statements. Based on the above description the system embodies the following functions. Text Parsing Engine (118) infers and labels potential well-formed sentences, thus empowering the Deconstruction Engine (120). This is accomplished by parsing text and applying rules: 1) the string of strings starts with an uppercase word or numeric value; 2) is well structured in spacing (one space between strings); 3) it is properly terminated with punctuation; and 4) the string is free of extreme conditions that would invalidate it as a sentence. An example would be any string of strings that meets these conditions, such as "Gastroesophageal reflux disease (Gerd) is a chronic digestive disease." This sentence meets all 4 rules and as a result the invention can infer that it is a potential well-formed sentence. The Deconstruction Engine (120) infers and labels sentences and their metadata and finalizes them as well-formed or not, thus resolving the potential as determined by the Text Parsing Engine (118), thus empowering the remaining engines. This is accomplished by 1) establishing the subject predicate based on rules, 2) identifying the subject pattern based on rules and a lexical database, and 3) establishing word types based on rules and lexical database of English nouns, verbs, adjectives and adverbs. Using the previous example, "Gastroesophageal reflux disease (Gerd) is a chronic digestive disease", once again, all 3 rules as satisfied, and the invention will infer this to be a well-formed sentence, removing the potential attribute. The Data Discovery Engine (122) infers and labels other indirectly communicated or unlabeled data. This is accomplished by 1) recognizing the authors' intent to introduce an acronym or abbreviation, make the semantic relationship between acronym or abbreviation and the proper noun; 2) recognizing the authors' intent to introduce a new compound noun by isolating the subject of the sentence and the use of consecutive uppercase words; and 3) recognizing relationships between the title of the document and the subject of discourse by isolating the subject and relating it to the title. With "Gastroesophageal reflux disease (Gerd) is a chronic digestive disease", the well-formed sentence includes the acronym "Gerd", the invention, in this case through rules #1 and #2, infers its meaning to equal "Gastroesophageal Reflux Disease". By doing so the invention can semantically relate the compound noun to the acronym, when observed in follow-on text. The Collocation Engine (124) infers and labels compound nouns. This is accomplished by 1) Looking for compound noun relationships established by the lexical database, or introduced by the system. The invention will infer through this rule that "Gastroesophageal reflux disease" is a compound noun. The Generic Noun Disambiguation Engine (128) infers and labels the generic noun with the proper noun value. This is accomplished by 1) establishing a gloss vector relationship between the generic noun and the topic of discourse or conversation, mark the generic noun with the semantic relation of the proper noun. For example, after processing the sentence "Paris is the capital and the most populous city of France." Paris is the current topic of discourse. The next sentence "The city is both a commune and department . . . " the invention will infer that city is equal to Paris and will assign the semantic relations of "Paris" to the word "city". The Pronoun Disambiguation Engine (130) infers and labels the pronoun with the proper noun value. This is accomplished by 1) isolating the pronoun in the subject space, 2) use the topic of discourse or conversation to mark the pronoun with the semantic relation of the proper noun. For example, after processing the sentence "Abraham Lincoln was an American politician and lawyer who served as the 16th President of the United States from March 1861 until his assassination in April 1865." Abraham Lincoln is the current topic of discourse. The next sentence "He was a descendant of Samuel Lincoln . . . ", the invention will infer that "He" is equal to "Abraham Lincoln" and will assign the semantic relations of "Abraham Lincoln" to the pronoun "He".

As desired, the computer-implemented, informational retrieval system for real-time, interactive semantic curation from a networked database may include more or fewer than the components illustrated.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Other implementations are also within the scope of the following claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described by reference to certain preferred embodiments, it should be understood that these embodiments are within the spirit and scope of the inventive concepts described. Accordingly, it is intended that the invention not be limited by the embodiments, but that it have the full scope permitted by the language of the following claims.

The embodiments of the invention in which an exclusive property or privilege is claimed are defined as follows:

1. A computer-implemented, informational retrieval system for real-time, interactive semantic curation from a networked database, the system comprising:
    (a) a gloss vector engine configured with means to generate semantic gloss vectors for data mining by unsupervised machine learning;
    (b) a deconstruction engine configured with means to identify well-formed sentences;
    (c) a data discovery engine configured with means to identify indirect communicating links;
    (d) a collocation engine configured with means to identify compound nouns;
    (e) a disambiguation engine configured with means to assign nouns that fit the context of the sentence in which said nouns occur;
    (f) a generic noun disambiguation engine configured with means to identify context shifts produced by use of nouns selected from the group of generic nouns, common nouns;
    (g) a pronoun disambiguation engine configured with means to link common nouns to proper corresponding nouns;
    (h) a data evaluation engine configured with means to identify well-formed sentences containing information of maximal semantic value;
    (i) a retrieval engine configured with means to return information with maximal semantic value score for a given search term;
    (j) a context targeting engine configured with means to display in context the specific output sentence that is generated by the input query, in the context of the source article containing said sentence;
    wherein one or more users can dynamically obtain responses to queries of multiple search terms across bodies of corpus.

2. The gloss vector engine in the computer-implemented, information retrieval system of claim 1, further comprising a reorganization of a relational lexical database into an automaton wherein all entries in said database are related to each other by word senses, sense content, and semantic relations and their sense content.

3. The deconstruction engine in the computer-implemented, information retrieval system of claim 1, further comprising a Novel Word Module and a Strong Verb Module with means to establish sentence structure in the analyzed corpus.

4. The data discovery engine in the computer-implemented, information retrieval system of claim 1, further comprising an Acronym and Abbreviation Identifier Module, a Compound Noun Identifier Module, a Definition Discovery Module and a Text/Title Relationship Identifier all with means to establish indirectly communicated information selected from the group comprising compound words, abbreviations, acronyms, definitions, and relationships between text and title.

5. The collocation engine in the computer-implemented, information retrieval system of claim 1, further comprising a module with means to identify one or more collocation words and replace said words with compound noun equivalents.

6. The disambiguation engine in the computer-implemented, information retrieval system of claim 1, further comprising a Gloss Vector Generation Module and Overlap Metric Module such that the with means to assign a definition to a noun in a phrase that minimizes the overlap score.

7. The generic noun disambiguation engine of the computer-implemented, information retrieval system of claim 1 further comprising mean for identification of a context shift so that said shift in context retains factual information.

8. The pronoun disambiguation engine of the computer-implemented, information retrieval system of claim 1 further comprising means for identification of a shift in context from a proper noun to a pronoun so as to retain semantic information provided that the pronoun is not a multiple pronoun.

9. The data evaluation engine of the computer-implemented, information retrieval system of claim 1 further comprising a Sentence Evaluation Module and a Scoring Module with means to select the sentence with the highest semantic value.

10. The retrieval engine of the computer-implemented, information retrieval system of claim 1 further comprising a Mining Module with means to rank order by semantic score using Subject Table, Object Table, and Adjunct Table.

11. The context targeting engine of the computer-implemented, information retrieval system of claim 1 further comprising a unique link generator that requests one or more HTML pages from the target source, finds the text consisting of said query results, modifies the HTML according to the selected and dynamically reformats the HTML to fit the user's device.

12. A computer-implemented method of semantic information retrieval based on a semantic dictionary augmented with explicit rules that enable machine learning and deep contextual understanding comprising:
curating in real-time and interactively semantic expressions taken from a networked database;
configuring a gloss vector engine operable to generate semantic gloss vectors for data mining by unsupervised machine learning;
configuring a deconstruction engine operable to identify well-formed sentences;
configuring a data discovery engine operable to identify indirect communicating links;
configuring a collocation engine operable to identify compound nouns;
configuring a disambiguation engine operable to assign appropriate nouns given context;
configuring a generic noun disambiguation engine operable to identify context shifts produced by use of generic or common nouns;
configuring a pronoun disambiguation engine operable to link common nouns to proper nouns;
configuring a data evaluation engine operable to identify well-formed sentences containing information of maximal semantic value;
configuring a retrieval engine operable to return information of the highest semantic value for a given search term; and
configuring a context targeting engine operable to display in context the specific sentence in the source article showing the query results wherein one or more users can dynamically obtain responses to queries of multiple search terms across bodies of corpus.

13. The computer-based method of claim 12 further comprising:
reorganizing a relational lexical database into an automaton; and
organizing all entries in said database to be related to each other by word senses, sense content, and semantic relations and their sense content.

14. The computer-based method of claim 12 further comprising:
establishing the sentence structure in an analyzed corpus; and
utilizing a Novel Word Module and a Strong Verb Module.

15. The computer-based method of claim 12 further comprising:
identifying Acronyms and Abbreviations via a Identifier Module, a Compound Noun Identifier Module, a Definition Discovery Module; and
establishing indirectly communicated information selected from the group comprising compound words, abbreviations, acronyms, definitions, and relationships between text and title via a Text/Title Relationship Identifier.

16. The computer-based method of claim 12 further comprising:
identifying one or more collocation words; and
replacing them with compound noun equivalents.

17. The computer-based method of claim 12 further comprising:
determining the appropriation definition of a noun in a phrase; and
assigning an appropriate definition to said noun.

18. The computer-based method of claim 12 further comprising:
identifying a context shift; and
retaining factual information.

19. The computer-based method of claim 12 further comprising:
identifying a context shift from a proper noun to a pronoun; and
retaining semantic information provided that the pronoun is not ambiguous, e.g., there are no multiple pronouns.

20. The computer-based method of claim 12 further comprising:
evaluating sentences; and
scoring said sentences to enable selection of information of maximal semantic value from a corpus.

* * * * *